(12) United States Patent
Konishi et al.

(10) Patent No.: US 6,169,385 B1
(45) Date of Patent: Jan. 2, 2001

(54) CAPACITY LEVELING CIRCUIT FOR A BATTERY GROUP

(75) Inventors: Daisuke Konishi; Yoshihiko Mizuta; Hideji Nakamura, all of Kyoto (JP)

(73) Assignee: Japan Storage Battery Co., Ltd., Kyoto (JP)

(*) Notice: Under 35 U.S.C. 154(b), the term of this patent shall be extended for 0 days.

(21) Appl. No.: 09/460,430

(22) Filed: Dec. 14, 1999

(30) Foreign Application Priority Data

Dec. 17, 1998 (JP) .................................................. 10-358746

(51) Int. Cl.$^7$ ....................................................... H02J 7/00
(52) U.S. Cl. ............................................. 320/118; 320/116
(58) Field of Search ...................................... 320/118, 116, 320/117; 307/66

(56) References Cited

U.S. PATENT DOCUMENTS

| | | | |
|---|---|---|---|
| 5,818,201 | * 10/1998 | Stockstad et al. | 320/118 |
| 5,914,606 | * 1/1999 | Becker-Irvin | 320/116 |
| 5,982,050 | * 11/1999 | Matsui | 320/107 |

* cited by examiner

Primary Examiner—Peter S. Wong
Assistant Examiner—Lawrence Luk
(74) Attorney, Agent, or Firm—Sughrue, Mion, Zinn, Macpeak & Seas, PLLC

(57) ABSTRACT

Forced discharging circuits each of which is configured by connecting in series a transistor, a reverse blocking Zener diode, and a discharging resistor are connected between positive and negative output terminals of cells, respectively. In each of the Zener diodes, the Zener voltage is set to be substantially equal to the cut-off voltage of discharge of the corresponding cell. The bases of the transistors are connected to a switching control circuit. The transistor of each of the forced discharging circuits is set so as to have a larger on-duty ratio, as the cell to which the forced discharging circuit is connected is remoter from a ground line, so that the average currents flowing through the cells are equal to one another.

11 Claims, 3 Drawing Sheets

CAPACITY LEVELING CIRCUIT FOR A BATTERY GROUP

BACKGROUND OF THE INVENTION

1. Field of the Invention

The present invention relates to a capacity leveling circuit which is used for a battery group configured by connecting plural cells in series, in order to level the capacities of the cells.

2. Description of the Related Art

For example, a traction battery for an electric vehicle is configured by a battery group in which a large number of cells are connected in series to provide a desired high voltage. In such a battery system, there is a fear that, when the cells are varied in capacity, voltage, temperature, and the like, the reliability of the battery system is lowered. Therefore, the states of each of the cells, such as the capacity, the voltage, the temperature, and the like are detected to monitor whether the cell is in a given condition or not.

In order to detect the voltage of each of such cells, usually, the configuration shown in FIG. 3 is used. In the figure, for the sake of simplicity, only four cells are illustrated. Voltage dividing circuits P1 to P4 each of which is configured by connecting resistors RA and RB in series are connected between the output terminals of cells C1 to C4 and a ground line serving as one of common output lines, respectively.

According to this configuration, the voltages of the cells C1 to C4 can be measured from voltages V1 to V4 appearing at the common junctions between the resistors RA and RB of the voltage dividing circuits P1 to P4, respectively.

When the voltage dividing circuits P1 to P4 are connected to the cells C1 to C4 as described above, there arises a problem in that the capacities of the cells are varied and hence the reliability of the system is lowered. This problem is caused by discharging currents i1 to i4 respectively flowing through the voltage dividing circuits P1 to P4. Namely, the discharging currents have relationships that, as shown in FIG. 3, the discharging current i1 flows through the cell C1 only, the discharging current i2 flows through the cells C1 and C2, the discharging current i3 flows through the cells C1, C2, and C3, and so forth. Consequently, a larger current always flows through the cells C1, C2, ... which are nearer to the ground line. As a result, the capacity of each of the cells is reduced in a larger degree as the cell is nearer to the ground line.

If the battery is of the type in which overcharge does not produce a serious problem, the capacities of the cells C1 to C4 can be leveled by charging the cell C1 the capacity of which is lowered by the largest degree, so as to be fully charged, and the other cells C2, C3, and C4 to be overcharged. In a battery of the type in which overcharge should be avoided, such as a lithium-ion battery, however, the capacities of cells cannot be leveled by the above-mentioned technique.

SUMMARY OF THE INVENTION

It is an object of the invention to provide a capacity leveling circuit for a battery group in which capacities of cells of the battery group can be leveled to enhance the reliability of the system.

In a first aspect of the present invention, a capacity leveling circuit for a battery group configured by connecting plural cells in series, a forced discharging circuit having a current-limiting element is disposed for each of the cells, and the forced discharging circuits are selectively activated, thereby leveling capacities of the cells.

According to the this configuration, for a cell in which the capacity tends to be lowered, the time period when the corresponding forced discharging circuit is activated is set to be zero or shortened, and, for a cell in which the remaining capacity is large, the time period is set to be lengthened, whereby the average currents are uniformalized. As a result, the capacities of the cells can be leveled.

In a second aspect of the present invention, in a configuration where voltage dividing circuits are connected between one of output terminals of a series connection of cells and output terminals of the cells to measure voltages of the cells, respectively, a forced discharging circuit having a current-limiting element is disposed for each of the cells, and the forced discharging circuits are selectively activated, thereby leveling capacities of the cells. Even under circumstances where the capacities tend to be varied by discharging currents flowing through the voltage dividing circuits for measuring the voltages of the cells, the capacities of the cells can be leveled. Namely, in the same manner as the invention of the first aspect, for a cell in which the capacity tends to be lowered, the time period when the corresponding forced discharging circuit is activated is set to be zero or shortened, and, for a cell in which the remaining capacity is large, the time period is set to be lengthened, whereby the average currents are uniformalized.

In a third aspect of the present invention, in the invention of the first and second aspects, each of the forced discharging circuits is configured by connecting a switch element, a reverse blocking Zener diode, and a discharging resistor in series, and a Zener voltage of the Zener diode is set to be substantially equal to a cut-off voltage of discharge of the cell.

According to this configuration, even when a switch element is short-circuited as a result of a failure of the switch element itself or a control circuit, the voltage of the corresponding cell is lowered to the cut-off voltage of discharge, and the Zener diode is then turned off, whereby the cell is prevented from being overcharged.

In a fourth aspect of the present invention, in a battery group configured by connecting plural cells in series, voltage dividing circuits being connected between one of output terminals of the series connection of the cells and output terminals of the cells to measure a voltage of the cell, respectively, a switch element is disposed in each of the voltage dividing circuits, and on/off states of the switch elements are selectively controlled, thereby leveling capacities of the cells.

According to this configuration, even when special forced discharging circuits are not disposed, forced discharging for leveling the capacities can be performed by using the voltage dividing circuits.

PREFERRED EMBODIMENTS OF THE INVENTION

Figure 1:
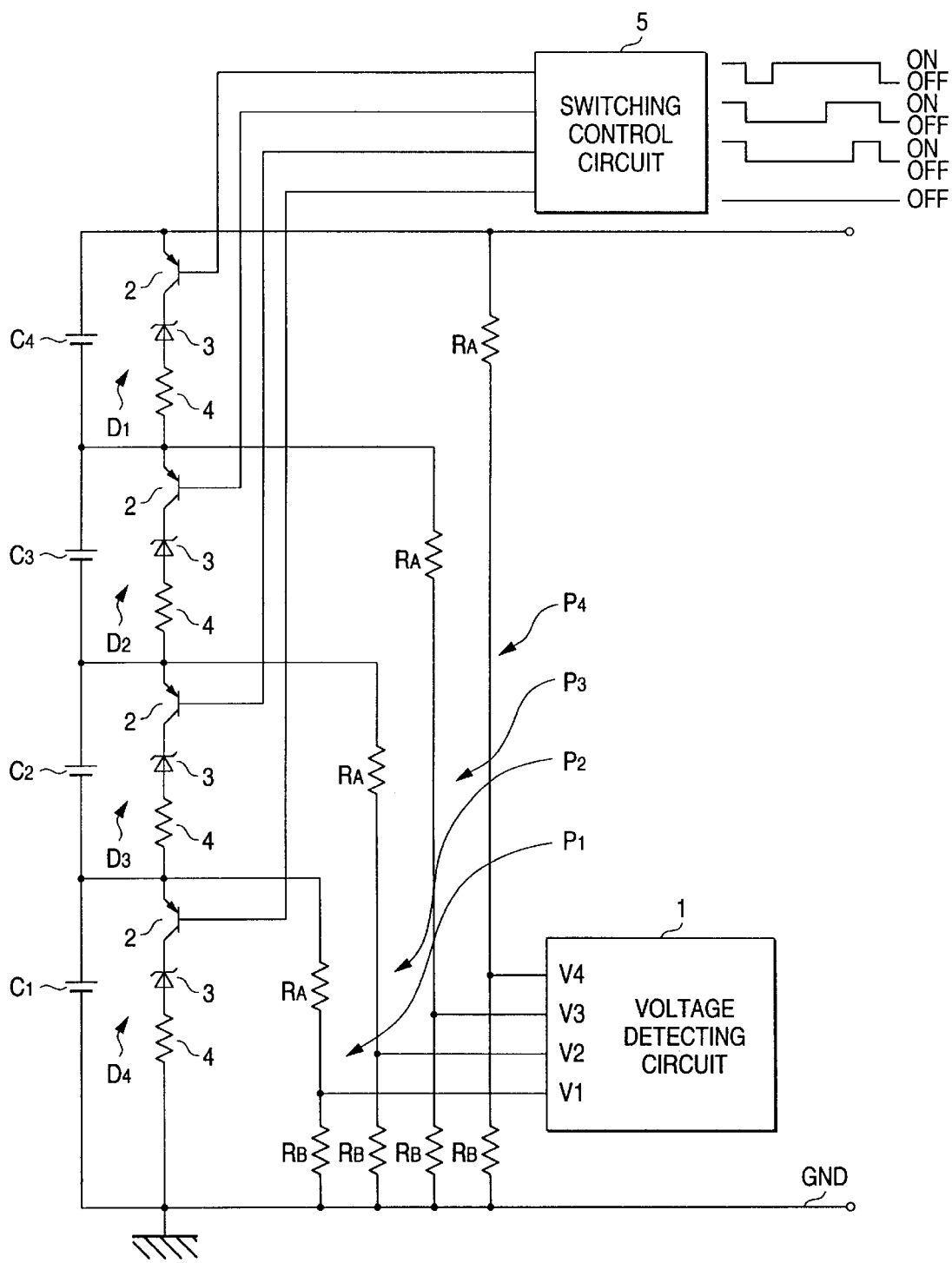
FIG. 1 is a circuit diagram showing a first embodiment of the invention.

Hereinafter, a first embodiment in which the invention is applied to, for example, a traction battery system for an electric vehicle will be described with reference to FIG. 1.

In the figure, for the sake of simplicity, only four cells are illustrated. Voltage dividing circuits P1 to P4 each of which is configured by connecting resistors RA and RB in series are connected between the output terminals of cells C1 to C4 and a ground line GND serving as one of common output lines, respectively. In all the voltage dividing circuits P1 to P4, the resistors RA and RB are configured in the same manner so as to attain the same voltage division ratio. In the voltage dividing circuits P1 to P4, the common junction of the resistors RA and RB is connected to a voltage detecting circuit 1 which detects voltages VC1 to VC4 of the cells C1 to C4 in accordance with the following expressions:

VC1=kV1

VC2=k(V2−V1)

VC3=k(V3−V2)

VC4=k(V4−V3)

where k is a proportional constant which depends on the voltage division ratio.

Forced discharging circuits D1 to D4 are connected between the positive and negative output terminals of the cells C1 to C4, respectively. Each of the forced discharging circuits is configured by connecting in series a transistor 2 of, for example, the PNP type and serving as a switch element, a reverse blocking Zener diode 3, and a discharging resistor 4 corresponding to a current-limiting element. In each of the Zener diodes 3, the Zener voltage is set to be substantially equal to the cut-off voltage of discharge of the corresponding cell. The bases of the transistors 2 are connected to a switching control circuit 5, so that the on/off states of the transistors are controlled by signals supplied from the circuit, respectively. The on/off control is performed in the following pattern. As shown in FIG. 1, the transistor 2 of the forced discharging circuit D1 for the cell C1 is always turned off, that of the forced discharging circuit D2 for the cell C2 is turned on only during a short period, that of the forced discharging circuit D3 for the cell C3 is turned on during a period which is longer than the turn-on period of the circuit D2, and that of the forced discharging circuit D4 for the cell C4 is turned on during the longest period. Namely, the transistor 2 of each of the forced discharging circuits is set so as to have a larger on-duty ratio, as the cell to which the forced discharging circuit is connected is remoter from the ground line GND. As seen from the following description of the function, namely, the on-duty ratios are set so that the average currents flowing through the cells C1 to C4 are equal to one another.

The function of the thus configured embodiment will be described. Based on the electromotive forces VC1 to VC4 of the cells C1 to C4, a weak current always flows through each of the voltage dividing circuits P1 to P4. The voltages VC1 to VC4 of the cells C1 to C4 are detected by the voltage detecting circuit 1 from the voltages V1 to V4 appearing at the common junctions between the resistors RA and RB. Since the cells C1 to C4 are connected in series, the current flowing through each of the cells C1 to C4 is larger in level as the cell is nearer to the ground line GND. From the viewpoint of the currents for measuring the voltage and flowing through the voltage dividing circuits P1 to P4, the capacity of each of the cells is reduced in a larger degree as the cell is nearer to the ground line GND.

In the forced discharging circuits D1 to D4, the on/off states of the transistors 2 are controlled by the signals supplied from the switching control circuit 5 in accordance with the predetermined on-duty ratios, respectively (the transistor 2 of the forced discharging circuit D1 is always turned off). Usually, the voltage of each of the cells is higher than the cut-off voltage of discharge. During the turn-on period of the corresponding transistor 2, therefore, the Zener diode 3 is conductive, so that a forced discharging current flows through the discharging resistor 4. The turn-on period of the transistor 2 of each of the forced discharging circuits is longer, as the cell to which the forced discharging circuit is connected is remoter from the ground line GND. With respect to the discharging currents flowing through the forced discharging circuits D1 to D4, therefore, the capacity of each of the cells tends to be reduced in a larger degree as the cell is remoter from the ground line GND. This tendency is opposite to the above-mentioned reducing tendency of the capacity due to the current for measuring the voltage. Namely, for the cells C1 to C4, the average currents respectively flowing through both the voltage dividing circuits P1 to P4 and the forced discharging circuits D1 to D4 can be uniformalized, whereby the leveling of the capacities of the cells C1 to C4 can be realized.

If the transistor 2 of one of the forced discharging circuits D1 to D4 is short-circuited as a result of a failure of the transistor 2 itself or the switching control circuit 5, the corresponding cell continues to be discharged. When the cell is discharged and its voltage reaches the cut-off voltage of discharge, the corresponding Zener diode 3 is turned off. Therefore, the discharging is stopped, so that the cell is prevented from being overcharged.

Figure 2:
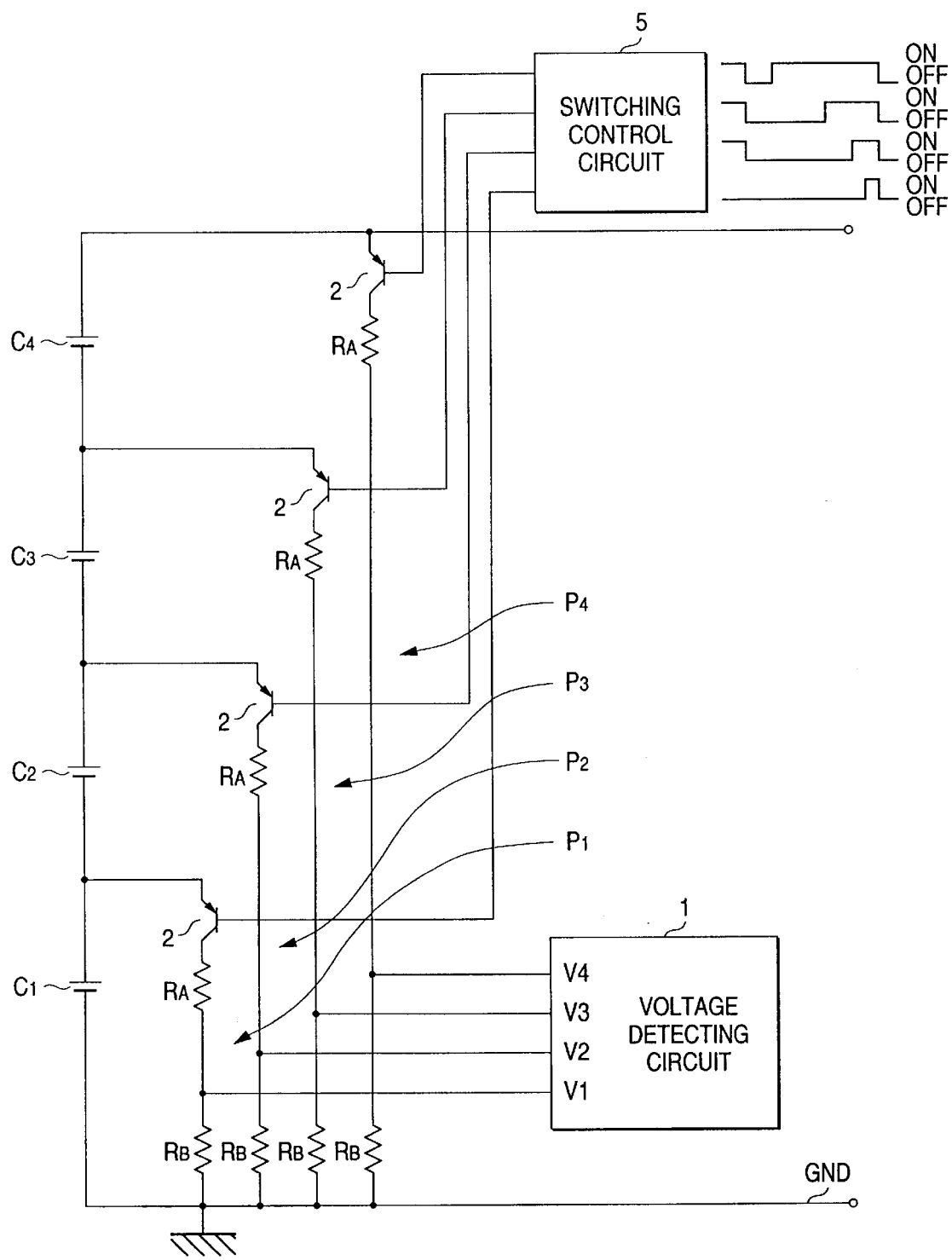
FIG. 2 is a circuit diagram showing a second embodiment of the invention.
Figure 3:
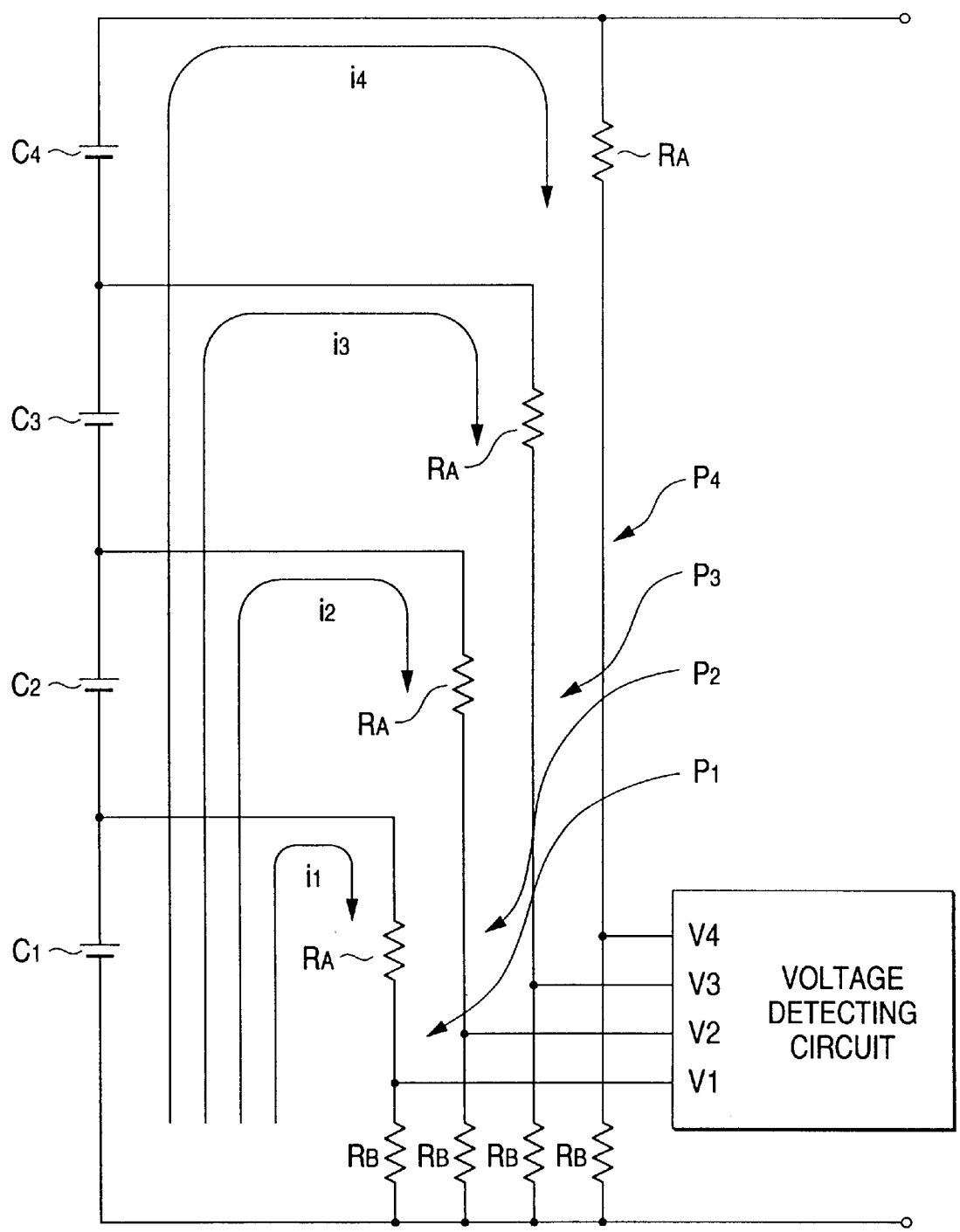
FIG. 3 is a circuit diagram showing a conventional example.

FIG. 2 shows a second embodiment of the present invention. The embodiment is different from the above-described embodiment in that the transistors 2 serving as switch elements are connected in series to the voltage dividing circuits P1 to P4 for measuring the voltages of the cells C1 to C4, respectively. In the same manner as the first embodiment, the on/off state of each of the transistors 2 is controlled by the switching control circuit 5 so that the on-duty ratio of the transistor 2 is larger as the cell to which the transistor is connected is remoter from the ground line GND, thereby leveling the average currents of the cells C1 to C4.

In this configuration also, there is a phenomenon in which the current for measuring the voltage and flowing through each of the cells C1 to C4 is larger in degree as the cell is nearer to the ground line GND. However, the turn-on period of each of the transistors 2 is shorter as the corresponding cell is nearer to the ground line GND. Therefore, the average currents of the voltage dividing circuits P1 to P4 can be uniformalized, whereby the capacities of the cells C1 to C4 can be leveled. In this configuration, during the period when the transistors 2 are turned on, voltages appear at the common junctions between the resistors RA and RB, respectively. Therefore, the voltage detecting circuit 1 detects at this timing the voltages of the cells C1 to C4. During the period when all the transistors 2 are turned off, it is possible to detect a breakage of the voltage detecting lines.

The present invention is not restricted to the embodiments which have been described above with reference to the drawings. For example, the following embodiments also are within the technical scope of the invention, and other various modifications can be made without departing from the spirit and scope of the invention.

(1) The embodiments described above are configured so as to cope with capacity variations caused by the currents flowing through the voltage dividing circuits for measuring the voltages of the respective cells. The cause of capacity variations is not restricted to this. When capacities are varied by any reason, the difference among the capacities of cells may be estimated from, for example, the voltage behaviors of the cells. During the period when the operation of the system is suspended, such as the case where an electric vehicle is parked, one of the cells which has a large remaining capacity may be subjected to forced discharging by turning on the transistor for the cell, whereby the capacities of the cells can be leveled.

(2) In the first embodiment, each of the forced discharging circuits is configured by connecting in series the transistor 2, the Zener diode 3, and the discharging resistor 4. Alternatively, each of the forced discharging circuits may be configured by a constant-current circuit in which a transistor or an FET is used as a current-limiting element, and the current-limiting element is selectively activated by a switch, a transistor, or the like so as to allow a discharging current to flow therethrough. In summary, it is requested that forced discharging circuits each having a current-limiting element are selectively activated, thereby leveling the average currents of the cells.

(3) In the same manner as the second embodiment, a switch element may be connected in series to each of the voltage dividing circuits P1 to P4 of the first embodiment. In this configuration, in addition to the forced discharging by the forced discharging circuits D1 to D4, the control on the currents flowing through the voltage dividing circuits P1 to P4 is performed, so that the average currents of the cells are uniformalized as a whole.

What is claimed is:

1. A capacity leveling circuit for a battery group configured by connecting plural cells in series, comprising:

a forced discharging circuit having a current-limiting element disposed for each of the cells; and a control unit for selectively activating said forced discharging circuit to level capacities of the cells, said control unit providing control signals having predetermined on-duty ratios where the turn-on period is longer as the cell to which the discharging circuit is connected is more remote from ground.

2. A capacity leveling circuit according to claim 1, wherein each of said forced discharging circuits comprises a switch element, a reverse blocking Zener diode and a discharging resistor, which are connected in series; and wherein a Zener voltage of said Zener diode is set to be substantially equal to a cut-off voltage of discharge of the cell.

3. A capacity leveling circuit according to claim 1 wherein said control unit provides open loop control of said discharge currents.

4. A capacity leveling circuit according to claim 1 wherein the average currents flowing through said cells are equal to one another.

5. A capacity leveling circuit for a battery group configured by connecting plural cells in series, comprising:

voltage dividing circuits being connected between one of output terminals of the series connection of the cells and output terminals of the cells to measure voltages of the cells, respectively; and a forced discharging circuit having a current-limiting element disposed for each of the cells, said forced discharging circuits being selectively activated to thereby level capacities of the cells, said activation being on the basis of predetermined on-duty ratios where the turn-on period is longer as the cell to which the discharging circuit is connected is more remote from ground.

6. A capacity leveling circuit according to claim 5, wherein each of said forced discharging circuits comprises a switch element, a reverse blocking Zener diode and a discharging resistor, which are connected in series; and wherein a Zener voltage of said Zener diode is set to be substantially equal to a cut-off voltage of discharge of the cell.

7. A capacity leveling circuit according to claim 5 wherein said selective activation is provided on an open loop control basis.

8. A capacity leveling circuit according to claim 5 wherein the average currents flowing through said cells are equal to one another.

9. A capacity leveling circuit for a battery group configured by connecting plural cells in series, comprising:

voltage dividing circuits being connected between one of output terminals of the series connection of the cells and output terminals of the cells to measure voltages of the cells, respectively; each of said voltage dividing circuits having a switch element so that on/off states of said switch elements are selectively controlled to level capacities of the cells, said selective control being on the basis of predetermined on-duty ratios where the turn-on period is longer as the cell to which the discharging circuit is connected is more remote from ground.

10. A capacity leveling circuit according to claim 9 wherein said selective control is provided on the basis of an open loop control.

11. A capacity leveling circuit according to claim 9 wherein the average currents flowing through said cells are equal to one another.

* * * * *